(12) United States Patent
Mikami et al.

(10) Patent No.: US 11,023,721 B2
(45) Date of Patent: Jun. 1, 2021

(54) DOCUMENT INFORMATION EVALUATING DEVICE, DOCUMENT INFORMATION EVALUATING METHOD, AND DOCUMENT INFORMATION EVALUATING PROGRAM

(71) Applicant: AI Samurai Inc., Tokyo (JP)

(72) Inventors: Takashi Mikami, Tokyo (JP); Yuki Adachi, Tokyo (JP); Hajime Shirasaka, Tokyo (JP)

(73) Assignee: AI Samurai Inc., Tokyo (JP)

( * ) Notice: Subject to any disclaimer, the term of this patent is extended or adjusted under 35 U.S.C. 154(b) by 0 days.

(21) Appl. No.: 16/963,851

(22) PCT Filed: Apr. 8, 2019

(86) PCT No.: PCT/JP2019/015368
§ 371 (c)(1),
(2) Date: Jul. 22, 2020

(87) PCT Pub. No.: WO2020/208693
PCT Pub. Date: Oct. 15, 2020

(65) Prior Publication Data
US 2021/0056304 A1    Feb. 25, 2021

(51) Int. Cl.
*G06F 17/00* (2019.01)
*G06K 9/00* (2006.01)
*G06F 40/40* (2020.01)

(52) U.S. Cl.
CPC ......... *G06K 9/00483* (2013.01); *G06F 40/40* (2020.01); *G06K 9/00463* (2013.01)

(58) Field of Classification Search
CPC ........ G06F 40/40; G06F 40/216; G06F 40/30; G06F 40/194; G06F 40/131;
(Continued)

(56) References Cited

U.S. PATENT DOCUMENTS

2004/0054521 A1* 3/2004 Liu .................. G06F 40/30
704/5
2009/0100053 A1* 4/2009 Boschee ............... G06F 16/334
(Continued)

FOREIGN PATENT DOCUMENTS

JP          06-28403 A     2/1994
JP       2001-117937 A    4/2001
(Continued)

OTHER PUBLICATIONS

Notice of Reasons for Refusal drafted Jun. 6, 2019 in counterpart Japanese Patent Application No. 2019-526021 (English).

*Primary Examiner* — Laurie A Ries
(74) *Attorney, Agent, or Firm* — DLA Piper LLP (US)

(57) ABSTRACT

An information acquiring unit configured to acquire input information input from a user terminal that is able to be operated by a user from the user terminal, a storage unit configured to store a plurality of pieces of document information, a calculation unit configured to decompose the input information into predetermined constituent units and calculate a matching condition with one piece of document information among the plurality of pieces of document information stored in the storage unit as a score for each decomposed constituent unit, an output unit configured to output a comparison table representing a degree of difference between the input information and the document information for each constituent unit on the basis of the score, and an input unit configured to input a self-evaluation of the document information that is performed by the user to the comparison table are included.

16 Claims, 5 Drawing Sheets

(58) Field of Classification Search
CPC ...... G06F 40/284; G06F 16/93; G06F 16/907; G06F 16/00; G06F 16/30; G06K 9/00483; G06K 9/00463
See application file for complete search history.

(56) References Cited

U.S. PATENT DOCUMENTS

| | | | |
|---|---|---|---|
| 2013/0322696 A1* | 12/2013 | Nomura | G06K 9/00751 382/103 |
| 2018/0075138 A1* | 3/2018 | Perram | G06F 16/93 |
| 2019/0034503 A1* | 1/2019 | Ephrat | G16H 40/67 |
| 2019/0205299 A1* | 7/2019 | Osaki | G06F 16/00 |
| 2020/0193153 A1* | 6/2020 | Lee | G06F 40/226 |

FOREIGN PATENT DOCUMENTS

| | | |
|---|---|---|
| JP | 2007-018389 A | 1/2007 |
| JP | 2009-294993 A | 12/2009 |
| JP | 2015-203961 A | 11/2015 |
| JP | 2017-138931 A | 8/2017 |

\* cited by examiner

[Fig. 1]
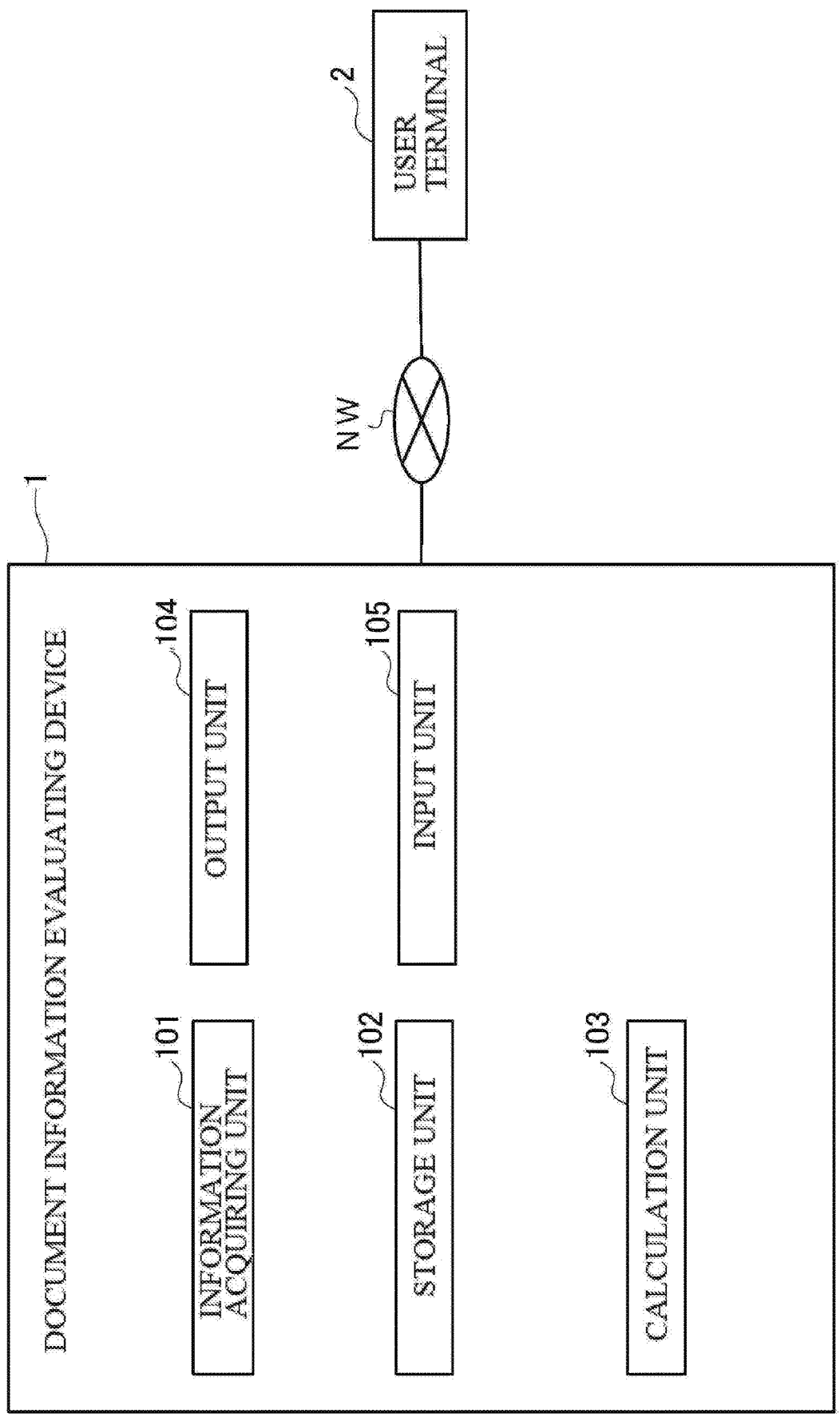

[Fig. 2]
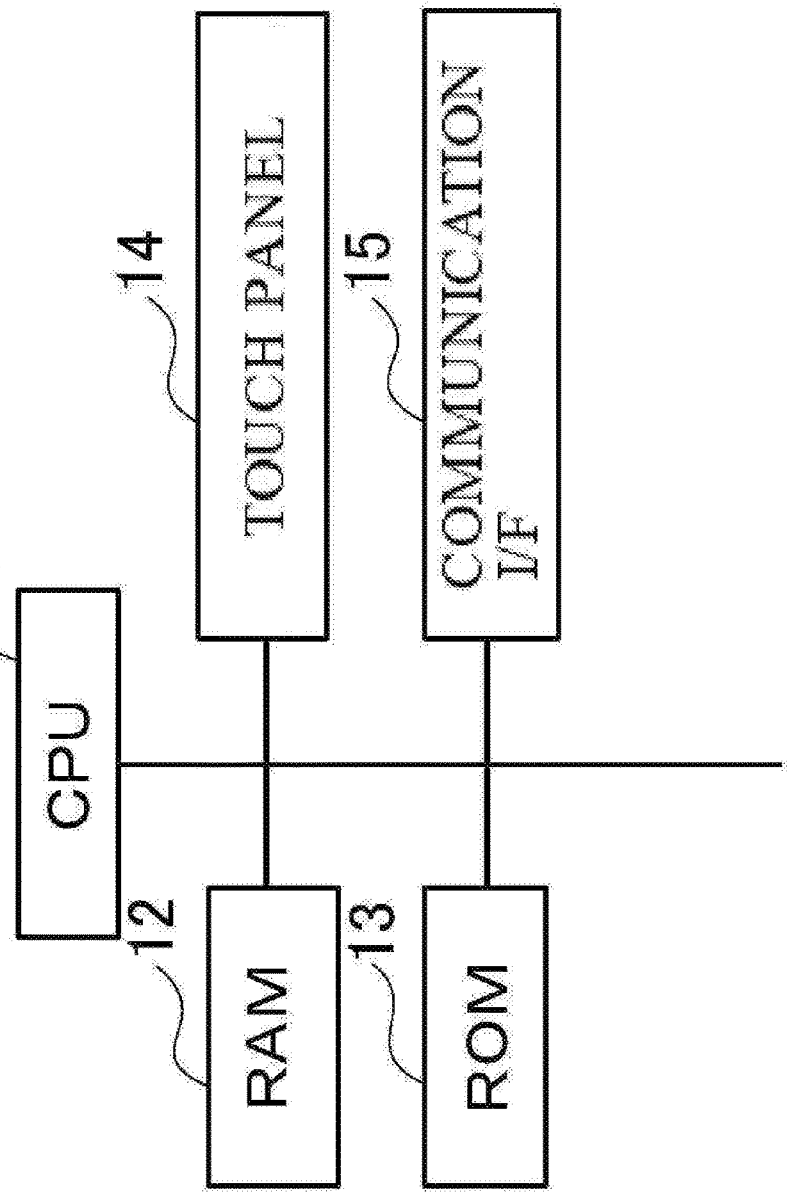

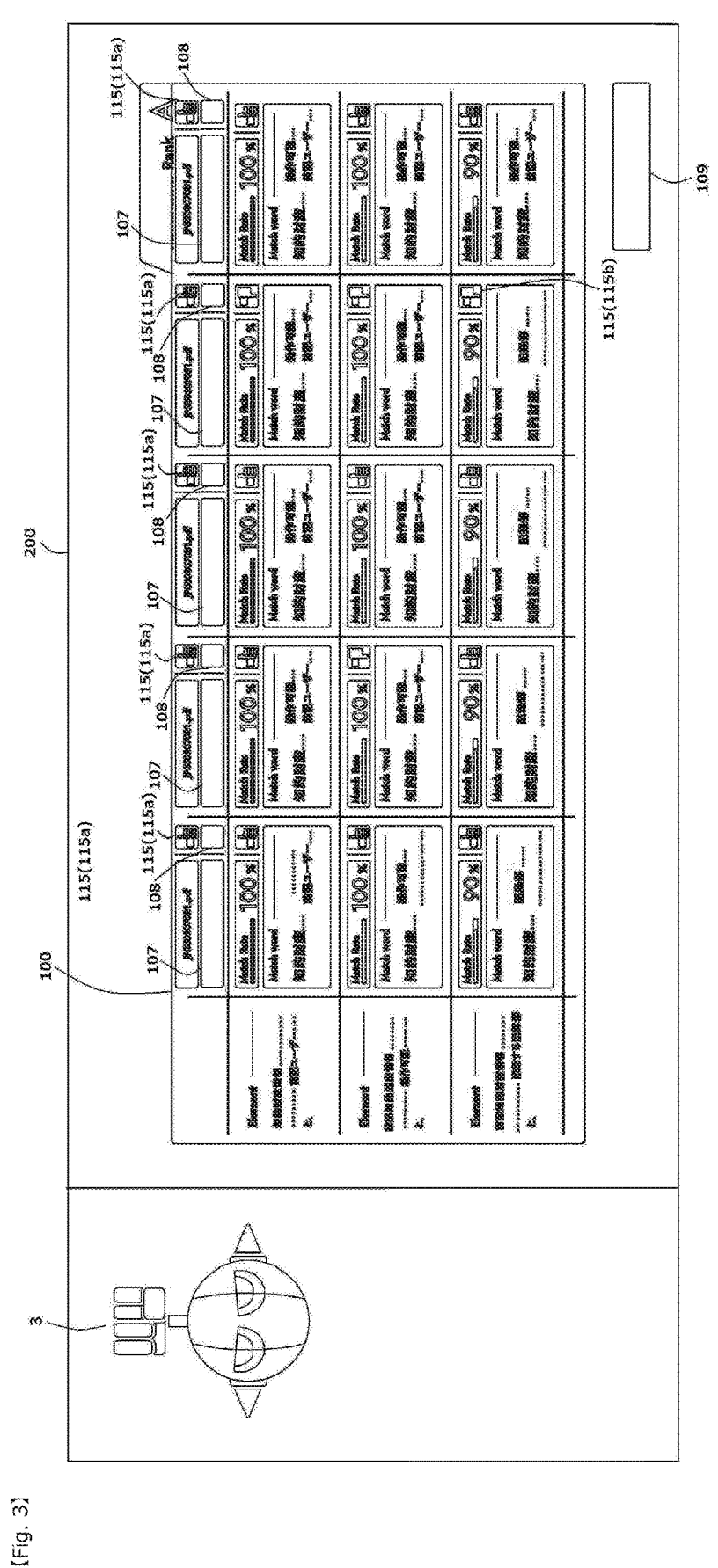

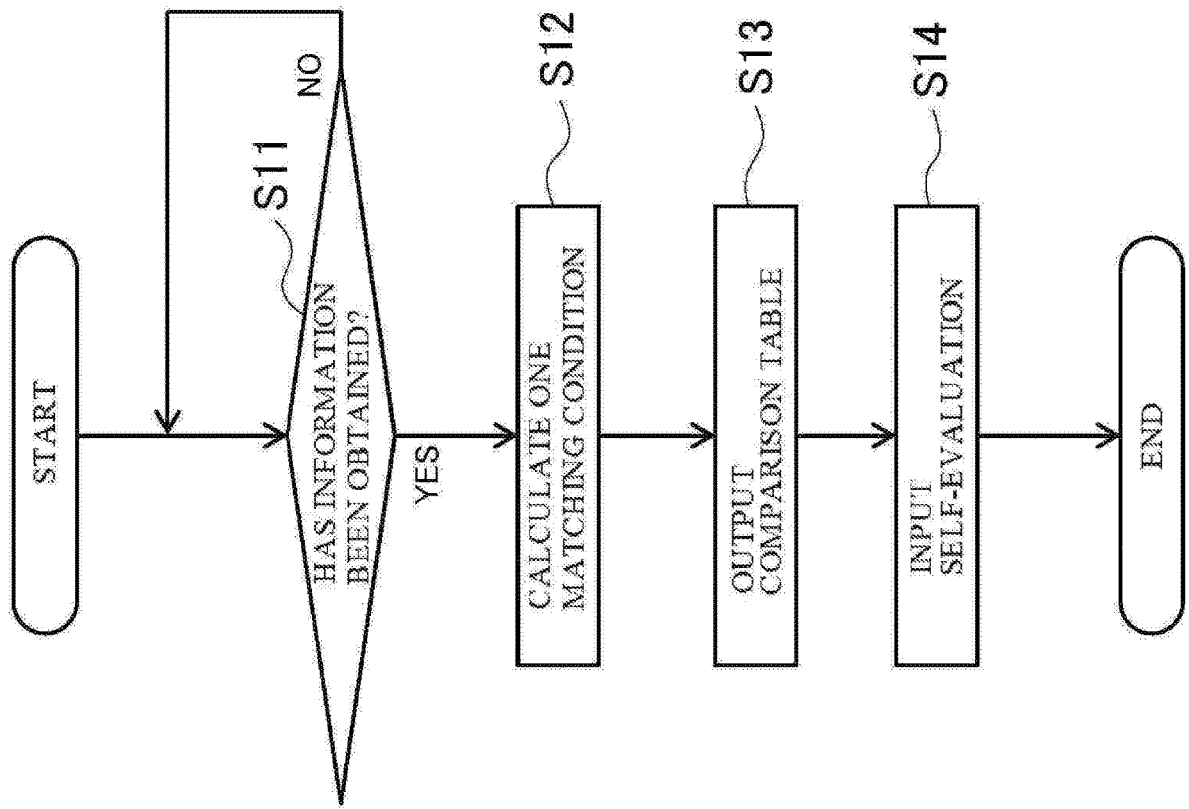
[Fig. 4]

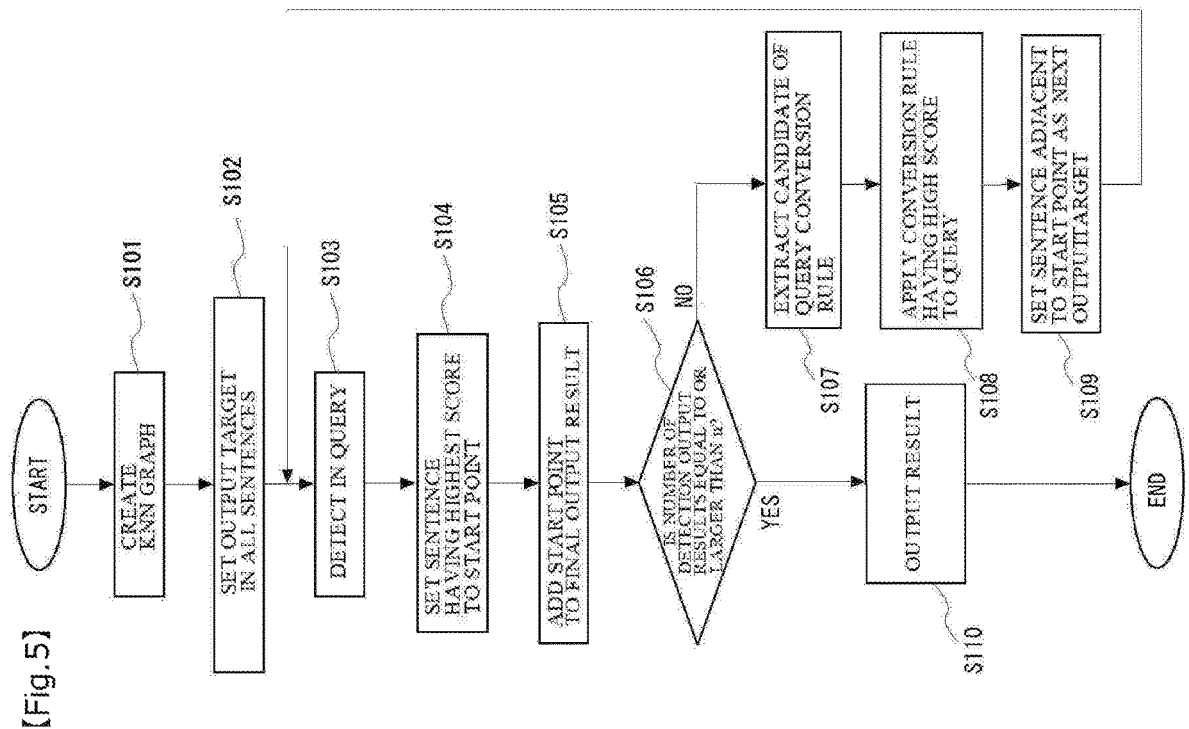
[Fig.5]

DOCUMENT INFORMATION EVALUATING DEVICE, DOCUMENT INFORMATION EVALUATING METHOD, AND DOCUMENT INFORMATION EVALUATING PROGRAM

TECHNICAL FIELD

This disclosure relates to a document information evaluating device, a document information evaluating method, and a document information evaluating program.

BACKGROUND

In recent years, systems retrieving document information of contents close to conditions from among document information of a large amount have been proposed (for example, see Japanese Unexamined Patent Application Publication No. 2015-203961). In JP '961, it has been described to calculate a weight of each piece of document information on the basis of appearance frequencies of keywords for each segment (constituent unit) configuring each part of the document information and score a degree of similarity using a predetermined criterion on the basis of weights. According to a system disclosed in JP '961, since the degree of similarity is scored for each segment of document information, document information can be reliably retrieved even when contents close to the conditions are written in only a part of the document information.

However, according to the system of JP '961, literature information, in which contents closed to conditions are written only in a part of document information, having a low degree of similarity as the whole document information may be retrieved. When literature information that is not intended by a user is retrieved, a keyword, a clause, a sentence and the like used in search conditions need to be selected again from the start. Then, the selection of search conditions is repeated any number of times until document information of contents close to the conditions is retrieved. This requires a large amount of time, and there is a large burden on the user.

In view of the problems described above, it could be helpful to provide a document information evaluating device, a document information evaluating method, and a document information evaluation supporting program that are capable of improving a search accuracy and reducing and optimizing a time required to retrieve document information of contents close to conditions.

SUMMARY

We thus provide:

A document information evaluating device includes: an information acquiring unit configured to acquire input information input from a user terminal that is able to be operated by a user from the user terminal; a storage unit configured to store a plurality of pieces of document information; a calculation unit configured to decompose the input information into predetermined constituent units and calculate a matching condition with one piece of document information among the plurality of pieces of document information stored in the storage unit as a score for each decomposed constituent unit; an output unit configured to output a comparison table representing a degree of difference between the input information and the document information for each constituent unit on the basis of the score; and an input unit configured to input a self-evaluation of the document information that is performed by the user to the comparison table.

The output unit may perform output by switching to a high evaluation mode representing that the document information is good or a low evaluation mode representing that the document information is not good in accordance with a result of the self-evaluation input by the input unit.

The output unit may output each piece of document information by switching to the high evaluation mode or the low evaluation mode for each constituent unit.

The output unit is able to output a degree of difference between the input information and the plurality of pieces of document information to the comparison table for each constituent unit of the input information, and output priority levels of the plurality of pieces of document information may be determined on the basis of whether or not the score calculated for each constituent unit satisfies a predetermined criterion.

The input information and the plurality of pieces of document information may include information relating to intellectual properties.

The calculation unit may reflect switching of a self-evaluation mode that represents the self-evaluation and re-calculate the matching condition of the document information with respect to the input information.

The document information evaluating device may further include a document information fixing unit configured to fix at least one piece of desired document information desired by the user among the plurality of pieces of document information output to the comparison table as main document information, and the calculation unit may re-calculate the matching condition of the document information with respect to the input information on the basis of the main document information fixed by the document information fixing unit.

A document information evaluating method using a computer includes: an information acquiring step of acquiring input information input from a user terminal that is able to be operated by a user from the user terminal; a storage step of storing a plurality of pieces of document information; a calculation step of decomposing the input information into predetermined constituent units and calculating a matching condition with one piece of document information among the plurality of pieces of document information stored in the storage step as a score for each decomposed constituent unit; an output step of outputting a comparison table representing a degree of difference between the input information and the document information for each constituent unit on the basis of the score; and an input step of inputting a self-evaluation of the document information that is performed by the user to the comparison table.

A document information evaluating program causes a computer to execute: an information acquiring function of acquiring input information input from a user terminal that is able to be operated by a user from the user terminal; a storage function of storing a plurality of pieces of document information; a calculation function of decomposing the input information into predetermined constituent units and calculating a matching condition with one piece of document information among the plurality of pieces of document information stored in the storage function as a score for each decomposed constituent unit; an output function of outputting a comparison table representing a degree of difference between the input information and the document information for each constituent unit on the basis of the score; and an input function of inputting a self-evaluation of the document information that is performed by the user to the comparison table.

A document information evaluating device, a document information evaluating method, and the intellectual property document information evaluation supporting program that are capable of improving a search accuracy, reducing the time required to retrieve document information of contents close to conditions, and realizing optimization of the search can be provided.

BRIEF DESCRIPTION OF THE DRAWINGS

FIG. 1 is a block diagram illustrating one example of the software configuration of a document information evaluating device according to one example.

FIG. 2 is a block diagram illustrating one example of the hardware configuration of an information processing apparatus 1 according to one example.

FIG. 3 is a schematic diagram illustrating an example of an output screen according to one example.

FIG. 4 is a flowchart illustrating an example of an operation of a document information evaluating device according to one example.

FIG. 5 is a flowchart illustrating one example of a score calculating process of a document information evaluating device 1 according to an example.

REFERENCE SIGNS LIST

1 Document information evaluating device
2 User terminal
101 Information acquiring unit
102 Storage unit
103 Calculation unit
104 Output unit
105 Input unit
115 Self-evaluation mode changeover switch
115a "Good!" function
115b "Bad!" function
106 Fixed switch
107 Input switch
108 Identifying switch
109 Search switch
100 Comparison table
200 Display screen
NW Network
11 CPU
12 RAM
13 ROM
14 Touch panel
15 Communication I/F

DETAILED DESCRIPTION

Hereinafter, an exemplary information processing document information evaluating device, a document information evaluating method, and a document information evaluating program will be described in detail with reference to the drawings.

First, the software configuration of a document information evaluating device 1 will be described with reference to FIG. 1. FIG. 1 is a block diagram illustrating one example of the software configuration of the document information evaluating device 1.

The document information evaluating device 1 includes functional units including an information acquiring unit 101, a storage unit 102, a calculation unit 103, an output unit 104, and an input unit 105. Each of the functional units of the document information evaluating device 1 according to this example will be described as a functional module that is realized by an information processing program (software) controlling the document information evaluating device 1. The document information evaluating program is operated by the document information evaluating device 1. In other words, the document information evaluating device 1 represents a device in which the document information evaluating program operates.

The output unit 104 outputs a result of calculation of a matching condition between input information and a plurality of pieces of document information as scores for the input information relating to a content desired to be retrieved by a user as a comparison table 100 as shown in FIG. 3. The user can input a self-evaluation to the comparison table 100 on the basis of a result of the output. In this way, the document information evaluating device 1 can improve a search accuracy and, when document information of contents close to a condition desired by a user is to be retrieved, a time required for the retrieval can be reduced, and optimization of the retrieval can be realized.

The document information evaluating device 1 is a device that is connected to a user terminal 2 through a network (NW) and is used to provide a service of a document information evaluating system for the user terminal 2. The document information evaluating device 1, for example, is a so-called server apparatus or a computer (for example, a desktop, a laptop, a tablet or the like). However, the document information evaluating device 1 is not limited thereto.

The information acquiring unit 101 acquires information relating to intellectual property, which has been input from the user terminal 2, from the user terminal 2. The user terminal 2 is a terminal device that can be operated by a user and, for example, is a desktop PC, a notebook PC, a tablet PC, a smartphone or the like. In this example, input information and document information are information relating to intellectual properties will be described.

Intellectual properties are ideas, creations and the like created by intellectual activities of humans. Intellectual property, for example, is an invention, a device, an industrial design, a trademark, a literary work, a circuit layout, or a new plant variety of plant. In addition, intellectual property, for example, is a document describing the content of intellectual property, a diagram, a table, a graph, a sketch, or a photograph (a drawing or the like) that describes the content of intellectual property, or a document or the like describing a drawing or the like. Information relating to intellectual property according to this example is information used to extract a content desired to be retrieved by a user described above. The information relating to intellectual property includes not only right-obtained information, but also public information before obtaining a right, undisclosed information, and invention information before an application. The right-obtained information, for example, is information indicating that a patent right, a utility right, an industrial design right, a trademark right, a copyright, a circuit layout, a breeder's right and the like are approved. For example, when the intellectual property is an invention, input information and document information are information such as sentences (description of claims, problems to be solved by the invention, an object of the invention and the like), drawings or the like representing contents of the invention. When the intellectual property is an industrial design, input information and document information are information such as a drawing and the like relating to a shape, a pattern, or a color or a combination thereof. When the intellectual property is a trademark, input information and document information are an identification mark of a product or a service.

The storage unit 102 stores document information. The document information includes various kinds of data transmitted/received through a NW and, for example, includes sentence data and numerical value data. The sentence data, for example, includes information relating to intellectual property, an idea sheet, an idea memo, information relating to a law suit, an essay, a book (including a magazine and a weekly magazine), a report, and a home page. The numerical value data, for example, includes experiment data, measurement data, statistical data, and inspection data. The sentence information includes numerical equation data, chart data, photograph data, and image data (including a still image and a moving image).

In addition, as described above, information before obtaining a right may be included in the information relating to intellectual property. The information before obtaining a right, for example, is additional information such as information in which a process until an invention or an industrial design is created is stored, materials or devices prepared for an experiment, experiment results, a title of research and development, an object of research and development, names of technical staff, names of organizations to which the technical staff belong, a project number and the like. In the additional information, information of access rights for the acquired information relating to intellectual property may be included. The access rights are rights for executing processes such as reading, editing, deleting, an authentication process for information, and the like, and, for example, an access right for executing all the processes is given to technical staff memorizing the information relating to the intellectual property, an access right for executing a reading process is given to technical staff who have co-created the intellectual property, or an access right for executing an authentication process is given to an authenticator (to be described later) who authenticates the information relating to the intellectual property. The information acquiring unit 101 may obtain such additional information as information relating to intellectual property. The information of the intellectual property input by the user is acquired from the user terminal 2.

In the following description, although an example in which the intellectual property is an invention will be illustrated, the intellectual property is not limited to the invention. In other words, the creation of intellectual property includes selection of an identification mark in a trademark and the like.

The calculation unit 103 calculates a matching condition for input information input from the user terminal 2 on the basis of document information stored in the storage unit 102. More specifically, input information is decomposed into predetermined constituent units, and a matching condition with one piece of document information among a plurality of pieces of document information stored in the storage unit 102 can be calculated as a score for each decomposed constituent unit. In the decomposition into constituent units, for example, constituent elements of "information relating to the intellectual property related as an inventor, an author, or an applicant" are segmented for each punctuation. Alternatively, segmentation may be performed for each constant length of a sentence or each predicate. When a constituent element is recognized, the calculation unit 103 acquires similar information using the output unit 104 and calculates a degree of similarity between the constituent element and the similar information. When a keyword is the same as a keyword of the constituent element, or a keyword of similar information has a narrower concept than that of the keyword, it may be determined that the matching condition is high. The calculation unit 103 can calculate presence/absence of a narrower concept or a broader concept using a corpus dictionary of words that are stored in the storage unit 102 in advance.

The calculation unit 103 calculates a matching condition between a constituent element and similar information as a score, determines matching/no-matching using a threshold process, and calculates a matching point and a different point of the constituent element. The threshold may be set in advance or may use a score calculated through machine learning.

In addition, more specifically, the calculation unit 103 can calculate a content matching condition of information relating to intellectual property accepted from the user terminal 2 with respect to input information as a score using a model acquired through machine learning using the information relating to the intellectual property stored in the storage unit 102 such that the matching condition is calculated as a score. In this way, the document information evaluating device 1 can calculate a score of a matching condition based on the information relating to the intellectual property (for example, past patent information) more quickly and accurately.

The information relating to the intellectual property used in machine learning is processed after the information relating to the intellectual property is digitalized in advance for each item and, similarly, input information relating to intellectual property input from the user terminal 2 is also digitalized and then, a score of a matching condition is calculated.

Items of the information relating to the intellectual property that are digitalized in advance, for example, may be various kinds of information associated with a laid-open publication relating to the intellectual property. The various kinds of information associated with a laid-open publication relating to the intellectual property may be, for example, an issuance date of the laid-open publication, a filing date (in other words, an application date) of application documents relating to the laid-open publication, the number of times of a notice of reasons for refusal received in an application relating to the laid-open publication, contents of the notice of reasons for refusal, contents of a response to the notice of reasons for refusal, the number of times of a correction in application relating to the laid-open publication, contents of the correction, the number of characters of independent claims, the number of claims and the like.

To calculate a score of a matching condition, the storage unit 102 stores an actual result of information relating to the intellectual property for which a matching condition was calculated as a score using the document information evaluating device 1 in the past as a feedback, whereby the calculation unit 103 can use the actual result for machine learning. In this way, the document information evaluating device 1 can extract similar prior art literatures with a higher accuracy.

When a different point is high (a matching point is low) as a result of calculation of a score of a matching condition for input information relating to the intellectual property input from the user terminal 2 by a user, the calculation unit 103 may extract a new keyword and calculate a score of a matching condition for each constituent element again. For example, the calculation unit 103 can calculate a score of a matching condition again for when a newly-extracted keyword is used instead of or in addition to a keyword used in the information relating to the intellectual property input from the user terminal 2. At this time, the calculation unit 103 can repeat the extraction of a keyword until the score of the matching condition becomes high. When the score of the matching condition is calculated to be high, a keyword extracted at this time can be output from the output unit 104 to the user terminal 2. For the extraction of a keyword, the keyword may be randomly extracted from document information relating to the intellectual property stored in the storage unit 102, the keyword may be extracted from input information relating to the intellectual property that is input from the user terminal 2, or a method of extracting a keyword may be set in advance using an Osborn's checklist in advance, and the keyword may be extracted on the basis of the method. In this way, the document information evaluating device 1 not only can calculate a score of a matching condition for the information relating to the intellectual property input from the user terminal 2, but also can present information indicating how the matching condition becomes high for the information relating to the intellectual property to the user and, thus, contents desired by the user can be retrieved with a high accuracy.

A keyword is a sentence, a phrase, an idiom, a word, a sign, an alphabet, a chemical formula, a number or the like.

When a matching point is high (a different point is low) as a result of the calculation of a score of a matching condition for the information relating to the intellectual property that is input from the user terminal 2, the calculation unit 103 can extract a keyword from the document information relating to the intellectual property stored in the storage unit 102 and, at this time, a keyword positioned at an end in a distribution in which a score of a matching condition becomes higher when a keyword extracted instead of or in addition to the keyword used in the input information relating to the intellectual property input from the user terminal 2 is used may be configured to be extracted. When a keyword is extracted, by extracting a keyword positioned not at the center, but at an end in a distribution in which a score of a matching condition becomes higher when a keyword extracted instead of or in addition to the keyword used in the input information relating to the intellectual property input from the user terminal 2 is used, the document information evaluating device 1 can present a keyword that can further lower the score of the matching condition at the time of limiting information relating to the intellectual property using the extracted keyword. For example, when the information relating to the intellectual property is an invention to be applied for a patent, the document information evaluating device 1 can extract a keyword that can cause the invention to be limited less while causing the possibility of obtaining a right for the invention to become positive.

More specifically, the calculation unit 103 calculates a new keyword to be attached to the information relating to the intellectual property on the basis of learning data and information of the possibility of obtaining a right from input information relating to the intellectual property, and the output unit 104 can output the new keyword. In this way, the document information evaluating device 1 can express information relating to the intellectual property to be easily understood by a user, and even a user having insufficient knowledge of intellectual properties can easily understand the information and propose an invention including a new keyword as information relating to the intellectual property.

In addition, when a difference is recognized, the calculation unit 103 may obtain a new similar patent through the output unit 104 for a constituent element having a high different point (a low matching point). More specifically, the calculation unit 103 may determine that a matching point is low and instruct the output unit 104 to output new similar information, and the output unit 104 may obtain the new similar information to embed a constituent unit having a low matching point. The calculation of a matching condition using the calculation unit 103 is executed in accordance with an input of a search signal to the calculation unit 103 by a user pressing a search button 109 as shown in FIG. 3.

The output unit 104 outputs an evaluation result of document information to the user terminal 2. For example, an evaluation result of document information is a comparison table that contrasts (compares) degrees of difference from document information (hereinafter, referred to as "similar information") that is similar to input information for each constituent unit. However, the evaluation result of the document information is not limited to a comparison table. For example, the evaluation result may be a simulated notice of reasons for refusal (a simulated notice simulating a notice of reasons for refusal) and also includes information relating to intellectual property related as an inventor or an applicant and the like. In a patent, the information relating to the intellectual property related as an inventor or an applicant is an invention memo or claims information in which invention information is described. The similar information, for example, is a prior art literature, and the comparison table 100 as shown in FIG. 3 is a so-called claim chart representing technical differences.

A self-evaluation mode representing a self-evaluation of a user is input to the input unit 105. A user can select the self-evaluation mode that represents a self-evaluation of the user. The self-evaluation mode is configured to be selectable using a self-evaluation mode changeover switch 115 as shown in FIG. 3. The output unit 104 displays and outputs the self-evaluation mode changeover switch 115 for the comparison table 100. Details thereof will be described below.

Each of the functional units including the information acquiring unit 101, the storage unit 102, the calculation unit 103, the output unit 104, and the input unit 105 included in the document information evaluating device 1 represents one example of the function of the document information evaluating device 1, and the functions of the document information evaluating device 1 are not limited thereto. For example, the document information evaluating device 1 does not need to have all the functions and thus may have some of the functions. In addition, the document information evaluating device 1 may have functions other than those described above. For example, the document information evaluating device 1 may have an input function for setting the function and an output function that indicates an operating state of the device using an LED lamp or the like.

As described above, each of the functional units included in the document information evaluating device 1 has been described to be realized by software. However, at least one or more functional units among the functional units included in the document information evaluating device 1 may be realized by hardware.

For any of the functional units included in the document information evaluating device 1, one functional unit may be divided into a plurality of functional units. In other words, any two or more of the above-described functional units included in the document information evaluating device 1 may be integrated into one function. In other words, FIG. 1 represents the functions included in the document information evaluating device 1 as functional blocks and, for example, does not represent that the functional units are configured by individual program files or the like.

In addition, the document information evaluating device 1 may be either a device realized by one casing or a system realized by a plurality of devices connected through a network or the like. For example, the document information evaluating device 1 may have some or all of the functions thereof to be realized by a virtual device such as a cloud service provided by a cloud computing system or the like. In other words, the document information evaluating device 1 may have at least one or more functional units among the functional units described above to be realized by another device. In addition, the document information evaluating device 1 may be a general-purpose computer such as a server apparatus or may be a dedicated device of which functions are limited.

Next, the hardware configuration of the document information evaluating device 1 will be described with reference to FIG. 2. FIG. 2 is a block diagram illustrating one example of the hardware configuration of a document information evaluating device 1 according to one example.

The document information evaluating device 1 includes a central processing unit (CPU) 11, a random access memory (RAM) 12, a read only memory (ROM) 13, a touch panel 14, and a communication interface (I/F) 15. The document information evaluating device 1 is a device that executes the information processing program described with reference to FIG. 1.

The CPU 11 controls the document information evaluating device 1 by executing an information processing program stored in the RAM 12 or the ROM 13. The document information evaluating program, for example, is obtained from a storage medium storing the document information evaluating program, a program distribution server through a network or the like, is installed in the ROM 13, is read out from the CPU 11, and is executed.

The touch panel 14 has an operation input function and a display function (an operation display function). The touch panel 14 enables a user using the document information evaluating device 1 to perform an operation input using a fingertip, a touch pen or the like. Although when the document information evaluating device 1 uses the touch panel 14 having an operation display function will be described, the document information evaluating device 1 may be configured to separately have a display device having a display function and an operation input device having an operation input function. In such an example, a display screen of the touch panel 14 can be a display screen of the display device, and an operation on the touch panel 14 can be an operation on the operation input device. The touch panel 14 may be realized in various forms such as a head mount type, a glass type, and a wrist watch type displays.

The communication I/F 15 is an I/F for communication. The communication I/F 15, for example, executes short-distance radio communication such as a wireless LAN, a wired LAN, or an infrared ray or the like. The communication I/F 15, for example, realizes communication with the user terminal 2 through the NW. The communication I/F 15 may realize communication with another document information evaluating device 1. Although only the communication I/F 15 for communication is illustrated in FIG. 2, the document information evaluating device 1 may include I/F's for communication in a plurality of communication systems.

Next, an example of the output of the output screen of the document information evaluating device 1 will be described with reference to FIG. 3. FIG. 3 is a schematic diagram illustrating an example of an output screen according to one example.

A self-evaluation mode representing a self-evaluation of a user is input to the input unit 105. In accordance with a user pressing the self-evaluation mode changeover switch 115 representing a self-evaluation of the document information as similar information in the comparison table 100, a self-evaluation instruction signal is input to the input unit 105. The output unit 104 displays and outputs the self-evaluation mode changeover switch 115 representing a user's self-evaluation of document information in the comparison table 100. By performing an operation of a click using a mouse or a keyboard for the self-evaluation mode changeover switch 115, a self-evaluation instruction signal is input to the input unit 105. By clicking on the self-evaluation mode changeover switch 115, a user can select a self-evaluation mode that represents a self-evaluation. In addition, the output unit 104 can output a self-evaluation to the comparison table 100 on the basis of the user's selection.

More specifically, the output unit 104 displays and outputs the self-evaluation mode changeover switch 115 in the comparison table 100, and a user performs an operation of selecting this self-evaluation mode changeover switch 115, in other words, a click using a mouse or an operation using a keyboard. Then, the output unit 104, for example, can display and output a figure (image) that is schematically designed as a self-evaluation mode on the basis of a selection operation on the self-evaluation mode changeover switch 115. In this way, by the user's operating the self-evaluation mode changeover switch 115 and selecting a self-evaluation mode, a user performs a self-evaluation selection instruction, and the input unit 105 accepts a self-evaluation instruction signal.

A user can select a self-evaluation mode representing his or her evaluation by clicking on the self-evaluation mode changeover switch 115 using the mouse. Then, on the basis of the self-evaluation instruction signal from the input unit 105, the output unit 104 can perform output by switching to a high evaluation mode representing that the document information is good or a low evaluation mode representing that the document information is not good in accordance with a result of the self-evaluation. For example, the self-evaluation mode changeover switch 115 may be a button, an icon or the like as long as it can perform output through switching.

As illustrated in FIG. 3, for an evaluation of the user, the high evaluation mode, for example, can output a "good!" function 115a such as "good!" representing that the evaluation is high or a "bad!" function 115b such as "not good" representing that the evaluation is low through switching. The output unit 104 can output the "good!" function 115a and the "bad!" function 115b with display forms thereof changed. As can be visually recognized, for example, as the display form of the "good!" function 115a, a pose taken when a positive event is expressed, for example, a figure in a form in which the thumb is upwardly directed in the state of grasping ones' hand can be output. In addition, a figure of a smiling face or a figure in the form of hands-up may be output. Alternatively, the display form of the "good!" function 115a may be configured to output a figure "o."

In addition, as illustrated in FIG. 3, as the display form of the "bad!" function 115b, a pose taken when a negative event is expressed, for example, a figure in a form in which the thumb is downwardly directed in the state of grasping ones' hand can be output. In addition, a figure of a pessimistic face or a figure in the form of shaking his or her head expressing a regrettable mode may be output. Alternatively, the display form of the "bad!" function 115b may be configured to output a figure "x."

The display forms of the "good!" function 115a and the "bad!" function 115b are not limited when a figure of the switch is displayed with change. For example, the output unit 104 may be configured to display the switch with the color thereof changed between the "good!" function 115*a* and the "bad!" function 115*b*. The switching of the self-evaluation mode (the "good!" function 115*a* or the "bad!" function 115*b*) described above may be performed for each piece of document information or may be performed for each constituent unit (element) of the input information. In this way, since the self-evaluation mode can be switched for each constituent unit, a high score of a constituent unit and a low score of a constituent unit can be visually recognized at first glance.

In addition, the output unit 104 may select the form of a character 3 on the basis of new similar information. More specifically, the output form of one of joy, anger, grief, and pleasure of the character may be configured to be selected in accordance with a content of the self-evaluation mode (the "good!" 115*a* function or the "bad!" function 115*b*). For example, when the self-evaluation mode is the "good!" function 115*a*, for example, display/output may be configured to be performed in the output form of "joy" or "pleasure." When the self-evaluation mode is the "bad!" function 115*b*, for example, display/output may be configured to be performed in the output form of "anger" or "grief." This display/output is executed by the output unit 104.

As described above, the output unit 104 can perform output control of the form of the character 3 on the basis of a score result of the matching condition that is calculated by the calculation unit 103. By performing output control of the form of the character 3 on the basis of data relating to the intellectual property that is calculated by the calculation unit 103, the document information evaluating device 1 can express information relating to the intellectual property using the character 3 and can allow even a user having insufficient knowledge of intellectual property laws to easily understand the information relating to the intellectual property.

As illustrated in FIG. 3, the output unit 104 can output a plurality of pieces of document information as similar patents output to the comparison table 100. Then, the output unit 104 outputs a degree of difference (a matching condition) between input information and the plurality of pieces of document information to the comparison table 100 for each constituent unit (element). In FIG. 3, although an example in which five pieces of document information are output is illustrated, the number of pieces of document information is not particularly limited. Output priority levels of five pieces of document information are determined whether or not a score representing a matching condition calculated for each constituent unit satisfies a predetermined criterion. For example, the predetermined criterion may be configured such that high-ranked five pieces of literature information in order of the largest to smallest values acquired by summing scores of each constituent unit are output from a left column to a right column. In addition, the predetermined criterion may be configured such that high-ranked five pieces of document information in order of the largest to smallest average values of scores of constituent units are output from a left column to a right column. Furthermore, the predetermined criterion may be configured such that high-ranked five pieces of literature information of which an average value of scores of several arbitrary constituent units among all the constituent units divided into a plurality of parts is equal to or larger than a predetermined value are output in order of largest to smallest average value from a left column to a right column. The identifying of arbitrary constituent units may be configured such that a user acquires arbitrary constituent units input from the user terminal 2. The acquisition of arbitrary constituent units is executed by the information acquiring unit 101. The arbitrary constituent units may be stored in the storage unit 102 in advance.

In addition, as document information that is output second when seen from the left side, document information of which an average value of scores of matching conditions of constituent units of the invention is the highest may be selected as a primary reference. Recognition of a matching point and a different point between the invention and the primary reference may be determined on the basis of whether or not a score of a matching condition of each constituent unit of the invention is equal to or higher than a predetermined value. Document information other than the primary reference may be configured such that a similar prior art literature of which a score of a matching condition is high for the constituent unit of which a score of a matching condition is low in the primary reference is selected as a secondary reference. In the comparison table 100, displays of a primary reference and a secondary reference in a prior art literature and displays of constituent units relating to the primary reference and the constituent units relating to the secondary reference may be included.

In this way, as illustrated in FIG. 3, a score of a matching condition for each constituent unit of the invention is output to the display screen 200 in the comparison table 100. A matching condition, for example, is a numerical value (%) representing a degree of inclusion of an extracted feature quantity of an invention in similar document information (prior art literature) and, as the numeral value is higher, it is represented that the constituent unit is disclosed in the prior art literature. The matching condition for each constituent unit is compared with each prior art literature as document information and is output to the comparison table 100. This output is executed by the output unit 104. In a first column of the comparison table 100 when seen from the left side, a constituent unit of decomposed invention (input information) is output. In a second to sixth columns when five pieces of document information are seen from the left side, a score of a matching condition for each prior art literature is output for each constituent unit.

Then, on the basis of scores of matching conditions that are calculated by the calculation unit 103, the output unit 104 can output a matching condition between input information and the document information as a score. A score result, for example, is output to the display screen 200 by the output unit 104 together with the comparison table 100. A score of a matching condition, for example, can be expressed in the format of —%  (for example, 80%). The calculation of the matching condition using the calculation unit 103 is executed in accordance with an input of a search signal to the calculation unit 103 from a user pressing the search button 109 as shown in FIG. 3.

In addition, the output unit 104 can select a form of the character 3 on the basis of new similar information and, more specifically, may be configured to select an output form of one of joy, anger, grief, and pleasure of the character in accordance with new similar information and scores of constituent elements.

As described above, the output unit 104 can perform output control of the form of the character 3 on the basis of a score result of the matching condition that is calculated by the calculation unit 103. By performing output control of the form of the character 3 on the basis of data relating to the intellectual property calculated by the calculation unit 103, the document information evaluating device 1 can express information relating to the intellectual property using the character 3 and can allow even a user having insufficient knowledge of intellectual property laws to easily understand the information relating to the intellectual property.

Then, the output unit 104 can select the form of the character 3 on the basis of the similar information that has been newly output. By causing the form of the character 3 to be newly selectable on the basis of new similar information, the document information evaluating device 1 can express information relating to the intellectual property such that it can be easily understood by a user and thus can allow even a user having insufficient knowledge of intellectual property laws to easily understand the information relating to the intellectual property.

The output unit 104, more specifically, can represent a score result of a matching condition acquired by the calculation unit 103 through the character 3. By representing a score result acquired by the calculation unit 103 through the character 3, the document information evaluating device 1 can represent the score result such that it can be easily understood by a user and can allow even a user having insufficient knowledge of intellectual property laws to easily understand information relating to registration/non-registration of the intellectual property.

In addition, the calculation unit 103 reflects switching of the self-evaluation mode selected by the user and can recalculate a matching condition of the similar prior art literature for input invention information. More specifically, in a comparison table that contrasts (compares) degrees of difference from document information similar to input information (a similar prior art literature) which is output by the output unit 104, constituent units in which the "good!" function 115*a* and the "bad!" function 115*b* are output and displayed are weighted, and the matching condition can be recalculated.

Next, one example of an operating process of the document information evaluating device 1 will be described with reference to FIG. 4. FIG. 4 is a flowchart illustrating an example of an operation of the document information evaluating device 1 according to one example. Operating process of document information evaluating device 1

In FIG. 4, the document information evaluating device 1 determines whether or not information relating to the intellectual property has been acquired from the user terminal 2 (S11). Whether or not information relating to the intellectual property has been acquired can be determined on the basis of whether or not the information acquiring unit 101 has acquired information relating to the intellectual property input from the user terminal 2. When it is determined that the information relating to the intellectual property has not been acquired (Step S11: No), the document information evaluating device 1 repeats the process of S11 and waits for acquisition of the information relating to the intellectual property.

On the other hand, when it is determined that the information relating to the intellectual property has been acquired (S11: Yes), the calculation unit 103 calculates a matching condition for input information input from the user terminal 2 on the basis of document information stored in the storage unit 102 (S12). More specifically, the input information is decomposed into a predetermined constituent unit and, for each decomposed constituent unit, a matching condition with one piece of document information among a plurality of pieces of document information stored in the storage unit 102 can be calculated as a score. The decomposition into constituent units, for example, segments constituent elements of "information relating to the intellectual property that relates as an inventor, an author, or an applicant" for each punctuation. Alternatively, segmentation may be performed for each constant length of a sentence or each predicate.

After executing the process of S12, the output unit 104 outputs a comparison table representing a degree of difference between the input information and the document information for each constituent unit on the basis of results of calculation of scores (S13). For example, an evaluation result of document information is a comparison table contrasting (comparing) degrees of difference from document information similar to the input information (hereinafter, referred to as "similar information") for each constituent unit. However, the evaluation result of document information is not limited to the comparison table 100. For example, the evaluation result may be a simulated notice of reasons for refusal (a simulated notice simulating a notice of reasons for refusal) and also includes information relating to the intellectual property related as an inventor or an applicant, and the like. In a patent, the information relating to the intellectual property related as an inventor or an applicant is an invention memo or claims information in which invention information is described. The similar information, for example, is prior art literature, and the comparison table 100 is a so-called claim chart representing technical differences. A score of a matching condition, for example, can be calculated as a numerical value in the range of "0%" to "100%."

After executing the process of S13, the input unit 105 inputs a self-evaluation of document information evaluated by the user to the comparison table (S14). A self-evaluation mode representing a user's self-evaluation is input to the input unit 105. In accordance with the user pressing the self-evaluation mode changeover switch 115 representing a self-evaluation of document information as similar information for the comparison table 100, a self-evaluation instruction signal is input to the input unit 105. The output unit 104 displays and outputs the self-evaluation mode changeover switch 115 representing a self-evaluation of document information evaluated by the user for the comparison table 100. By performing an operation of a click using a mouse or a keyboard for the self-evaluation mode changeover switch 115, a self-evaluation instruction signal is input to the input unit 105. By clicking on the self-evaluation mode changeover switch 115, a user can select a self-evaluation mode that represents a self-evaluation. In addition, the output unit 104 can output a self-evaluation to the comparison table 100 on the basis of the user's selection. More specifically, the output unit 104 displays and outputs the self-evaluation mode changeover switch 115 in the comparison table 100, and a user performs an operation of selecting this self-evaluation mode changeover switch 115, in other words, a click using a mouse or an operation using a keyboard. Then, the output unit 104, for example, can display and output a figure (image) that is schematically designed as a self-evaluation mode on the basis of a selection operation on the self-evaluation mode changeover switch 115. In this way, by selecting a self-evaluation mode by operating the self-evaluation mode changeover switch 115, a user performs a self-evaluation selection instruction from the user, and the input unit 105 accepts a self-evaluation instruction signal. A self-evaluation selection instruction is accepted by the output unit 104.

A user can select a self-evaluation mode representing his or her evaluation by clicking on the self-evaluation mode changeover switch 115 using the mouse. Then, on the basis of the self-evaluation instruction signal from the input unit 105, the output unit 104 can perform outputting by switching to a high evaluation mode representing that the document information is good or a low evaluation mode representing that the document information is not good in accordance with a result of the self-evaluation. For example, the self-evaluation mode changeover switch 115 may be a button, an icon, or the like as long as it can perform output through switching. After executing the process of S14, the document information evaluating device 1 ends the operation illustrated in the drawing.

The calculation of the score of a matching condition, for example, can be performed using the following processes.

FIG. 5 is a flowchart illustrating one example of a score calculating process of the document information evaluating device 1 according to a first example.

Process of Calculating Score of Matching Condition

When the information acquiring unit 101 acquires input information representing an evaluation target, the calculation unit 103, first, generates a kNN graph (S101). The kNN graph is generated in the following order. First, all sentences included in technical information accompanying technical information relating to the intellectual property, which has been acquired by the information acquiring unit 101 through the user terminal 2, input information as prior art information, and similar technical information similar to input information stored in the storage unit 102 are vectorized. The vectorization may be performed using conventional technologies such as Word2Vec, Doc2Vec (Paragraph2vec), Latent Dirichlet Allocation (LDA), or Neural Tensor Skip Gram (NTSG). The vectorization is executed by the calculation unit 103. A distance matrix between sentences is generated from vectors. Each sentence is set as a vertex, and a side extends from each character data to k sentences having short distances therefrom. A kNN graph is generated in accordance with the order described above. Although a sentence has been described, a combination of a plurality of clauses, a clause, or a word may be used.

Subsequently, the calculation unit 103 sets similar document information that is an output target for input information as technical information acquired from the information acquiring unit 101 to all the sentences included in similar technical information similar to input information stored in the storage unit 102 and intellectual property information (S102) and sets technical words included in the input information (technical information) acquired from the information acquiring unit 101 to a query, and the output unit 104 outputs similar document information set as the output target in the query (S103). The output may be performed using a conventional technology such as Elastic Search (registered trademark).

The output unit 104, as results of outputs, sets a sentence having the highest score as a start point (S104), adds the start point to a final output result (S105), and repeats the process until the number of final output results becomes equal to or larger than n (S106). When the number of final output results is smaller than n, the process proceeds to S107. On the other hand, when the number of final output results is equal to or larger than n, the process proceeds to S110.

When the number of final output results is smaller than n, the calculation unit 103 extracts candidates for a query conversion rule (S107). The candidates for the query conversion rule are extracted in the following order. First, a sentence similar to the sentence set as the start point is extracted on the basis of the generated kNN graph. Subsequently, words recognized to have a high degree of importance in the sentence set as the start point and the extracted similar sentence are extracted. The recognition of a degree of importance may be performed using a conventional technology such as a TF-IDF method. Words that are adjacent to the extracted words in the sentence set as the start point and the extracted similar sentence are obtained. For example, when an extracted word is "distributed" and a sentence is "a distributed process in a distributed file system," adjacent words are "file," "process" and the like.

The calculation unit 103 applies a conversion rule having a high score to the query (S108). One or a plurality of conversion rules may be used, and the number of the conversion rules may be controlled by the calculation unit 103. The number of new queries calculated using the conversion rule may be controlled by the calculation unit 103 on the basis of user's evaluation information for a result of an evaluation of technical information (input information) representing an evaluation target that has been acquired by the information acquiring unit 101. A score can be calculated using the following equation:

$$\text{score}(w1, w2) = \frac{P(w1, A) \times P(w2, B)}{P(w1, B) \times P(w2, A)} \times \text{similarity}(w1, w2).$$

In the equation, a sentence set as a start point is denoted by A, an adjacent word acquired in the sentence set as the start point is denoted by w1, an extracted similar sentence is denoted by B, an adjacent word acquired in the extracted similar sentence is denoted by w2, and an appearance probability of a word w in a sentence X is denoted by P(w, X). A similarity is an index of semantic closeness between words. As this value is larger, it represents that the two words are semantically similar to each other. The similarity may be set as a value that is calculated by nitk that is a package of Python on the basis of a path length of WordNet.

The calculation unit 103 sets a sentence adjacent to the start point as a next output target (S109) and performs output again using a query that has been newly calculated in S108 (return to S103).

When the number of final output results becomes n or more, the results are output (S110). At this time, the output unit 104 may output document information including the sentence that is the start point regarded as a final output result or document information.

Next, one example of the re-calculation process of the document information evaluating device 1 will be described.

Calculation Process of Re-Calculation

Re-calculation of a score of a matching condition, for example, is performed in the following order:

(1) First, appropriate document information and inappropriate document information are vectorized (hereinafter, respectively referred to as an "appropriate document vector" and an "inappropriate document vector"). The calculation unit 103 calculates an appropriate document vector and an inappropriate document vector. The calculation of document vectors, for example, may be performed using Word2Ves, Doc2Vec (Paragraph2vec), LDA, or NTSG. In this example, the appropriate document vector is acquired by vectorizing document information in constituent units from which the "good!" function 115a is output. In addition, the inappropriate document vector is acquired by vectorizing document information in constituent units from which "bad!" function 115b is output.

(2) Next, the calculation unit 103 calculates a document vector (hereinafter, referred to as an "input document vector") of input information input from the user terminal 2 that can be operated by the user. The calculation of the document vector, for example, may be performed using Word2Ves, Doc2Vec (Paragraph2vec), LDA, or NTSG.

(3) Next, the calculation unit 103 calculates a center of gravity by taking weights of the input document vector, the appropriate document vector, and the inappropriate document vector into account. In this example, the document information evaluating device 1 is configured to be able to recalculate the score of the matching condition. A center of gravity represents a weight of each of the input document vector, the appropriate document vector, and the inappropriate document vector before performing a search. More specifically, when re-calculation of the score of the matching condition of the second time is performed, a center of gravity is calculated with the weights calculated when the calculation of the score of the matching condition of the first time is performed before the calculation of the score of the matching condition of the second time taken into account. In the calculation of the score of the matching condition of the first time, there is no difference between weights of the input document vector, the appropriate document vector, and the inappropriate document vector, and thus, for example, a center of gravity is calculated as (a weight of the input document vector, a weight of the appropriate document vector, a weight of the inappropriate document vector)=(1, 1, 1).

(4) The calculation of weights and a center of gravity is executed by the calculation unit 103. Every time the score of the matching condition is recalculated, the weights of the input document vector, the appropriate document vector, and the inappropriate document vector are recalculated, and the re-calculation of the center of gravity is executed, and a process of correcting the input document vector, the appropriate document vector, and the inappropriate document vector is performed in accordance therewith. This correction process is executed by the calculation unit 103. More specifically, an inner product of the input document vector and the appropriate document vector, for which the correction process has been performed by the calculation unit 103, and the center of gravity vector of the center of gravity calculated in (3) is calculated.

(5) The calculation unit 103 executes the process of correcting (re-calculating) the weights of the input document vector, the appropriate document vector, and the inappropriate document vector on the basis of the inner product calculated in (4) again. The adjustment of the weights based on the document vector correcting process, for example, can be performed using Sparse Composite Document Vectors using Soft clustering over distributional representations (SCDV). In addition, the calculation of the document vectors may be performed using Word2Ves, Doc2Vec (Paragraph2vec), LDA, or NTSG.

(6) Next, on the basis of the weights of the input document vector, the appropriate document vector, and the inappropriate document vector that have been newly calculated in (4) and (5), the calculation unit 103 executes re-calculation of the score of the matching condition of the document information with respect to the input information.

(7) For the re-calculation of the matching condition, for example, the output unit 104 can execute the process of recalculating the score of the matching condition any number of times until desired document information is output and, a user interface that can display the comparison table 100 as output results at each time is included.

(8) When a user inputs input information and presses the search button 109, a comparison table 100 as a search result is output. In the comparison table, a score result of the matching condition is output for each constituent unit. The output of the re-calculation of the matching condition is executed each time when re-calculation is performed by pressing the search button 109. The user interface may be generated such that the search button 109 can be continuously pressed in a short time.

This re-calculation may be repeated any number of times until the user outputs desired literature information. The re-calculation of the matching condition is executed in accordance with an input of a search signal to the calculation unit 103 by a user pressing the search button 109 as shown in FIG. 3. In this way, the accuracy of the search can be improved, and the user reduces a time required for retrieving document information (similar document information) of contents close to the conditions, and optimization of the search can be realized.

Method of Calculating Center of Gravity

Subsequently, a method of calculating a center of gravity will be described in detail. A center of gravity is set at a position that is near the appropriate document information and is far from the inappropriate document information.

(1) First, a weight is applied to the appropriate document vector. When there are a plurality of appropriate document vectors, for each appropriate document vector, a center of gravity is calculated by applying each weight according to the appropriate document vector. As the center of gravity, the center of gravity is calculated by calculating (adjusting) weights such that it is set at a position that is near the appropriate document information and is far from the inappropriate document information and taking the weights into account. The calculation of the weights and the center of gravity is executed by the calculation unit 103.

(2) The adjustment of the weights can be calculated using a parameter determined on the basis of the center of gravity vector, the appropriate document vector, and the inappropriate document vector calculated in (1). The parameter is calculated on the basis of the following equation. The calculation of the parameter is executed by the calculation unit 103.

Parameter=(a distance between the inappropriate document vector and the center of gravity vector)/(a distance between the appropriate document vector and the center of gravity vector)

(3) The weights of the input document vector, the appropriate document vector, and the inappropriate document vector are adjusted using the parameter calculated in (2), and a new vector is calculated for each vector on the basis of the adjusted weights. The calculation of these new vectors is executed by the calculation unit 103.

The adjustment of the weights, for example, can be performed using Sparse Composite Document Vectors using Soft clustering over distributional representations (SCDV). In addition, the calculation of the document vectors may be performed using Word2Ves, Doc2Vec (Paragraph2vec), LDA, or NTSG.

Next, a document information recalculating method of the document information evaluating device 1 according to another example will be described.

As illustrated in FIG. 4, at least one piece of desired document information determined by a user as being the most similar to input information among a plurality of pieces of document information output to the comparison table 100 can be fixed as main document information. The fixing of the main document information is executed by a document information fixing unit (not illustrated in the drawing).

In more detail, the output unit 104 outputs a figure (image) of a main document information fixing switch 106 representing the fixing of the main document information to the comparison table 100, and a user performs an operation of selecting this switch, in other words, a click using a mouse or an operation using a keyboard. Then, a main document information fixing instruction signal is input to a document information fixing unit (not illustrated in the drawing). The user selects a main information fixing mode by operating the main document information fixing switch 106, and a fixing instruction for a plurality of pieces of document information from the user is configured to be accepted on the basis of the main document information fixing instruction signal.

The user can select the main information fixing mode by clicking on the main document information fixing switch 106 using a mouse. In addition, the main document information fixing switch 106, for example, may be a button, an icon, or the like as long as it can be used for selecting the main information fixing mode.

The main information fixing mode can be freely selected by the user, and certain document information among a plurality of pieces of similar document information output to the comparison table 100 by the output unit 104 may be selected as main document information. The selection is not limited to one piece of main document information, and two or more pieces of document information may be selected as main document information.

In addition, main document information can be designated by the user. As illustrated in FIG. 4, main document information can be also fixed by the user inputting document information to the input box 107. The document information that can be also input in this example is not limited to one piece of information. The user can input two or more pieces of document information. Then, the user inputs main document information to the input box 107 and presses an identifying switch 108, whereby re-calculation of the matching condition is executed. For example, the document information input to the input box 107, for example, may be a notice of reasons for refusal and a simulated notice of reasons for refusal (a simulated notification simulating a notice of reasons for refusal) and also includes information relating to the intellectual property related as an inventor or an applicant and the like. In a patent, the information relating to the intellectual property related as an inventor or an applicant is an invention memo or claims information in which invention information is described. The similar information, for example, includes prior art literature. In addition, document information input to the input box 107 is not limited to a preceding patent literature number. The document information input to the input box 107 includes sentence data and numerical data. The sentence data, for example, includes information relating to the intellectual property, an idea sheet, an idea memo, information relating to a law suit, an essay, a book (including a magazine and a weekly magazine), a report, and a home page. The numerical value data, for example, includes experiment data, measurement data, statistical data, and inspection data. In addition, the document information input to the input box 107 includes numerical equation data, chart data, photograph data, and image data (including a still image and a moving image). In such an example, by performing drag and drop of PDF electronic data for the input box 107, the PDF electronic data can be taken in. In addition, by performing drag and drop of PDF electronic data of a preceding patent literature, the PDF electronic data can be taken in.

For example, the output unit 104 can designate at least one or more constituent units among a plurality of constituent units acquired by decomposing the input information and output (extract) a plurality of piece of document information in which the designated constituent units are included. The designation of a constituent unit can be performed by switching the self-evaluation mode changeover switch 115 to the "good!" function 115*a*. Then, a score of a matching condition is calculated for a plurality of pieces of document information (similar prior art literatures) in which specific constituent units are included, and the document information is displayed and output for the comparison table 100. In this way, a prior art literature that is more similar to the input information can be output. The calculation of a plurality of pieces of document information in which specific constituent units are included is performed using a method similar to that of the re-calculation process described above. Then, specific document information among document information output by the output unit 104 can be fixed as main document information by the user pressing the main document information fixing switch 106.

The re-calculation can be performed by adjusting the weights of the input document information on the basis of the main document information. The re-calculation method is performed using a method that is similar to that of the re-calculation based on the self-evaluation mode described above.

The main document information, for example, may be patent literature or non-patent literature such as a book or a magazine researched by the user in the past in addition to citation information and reference information cited as a result of examination performed in the past in a patent office of each country.

In addition, the document information evaluating device 1 according to this example may include a determination unit (not illustrated in the drawing) that determines the possibility of obtaining a right. The determination unit (not illustrated in the drawing) searches for similar prior art literature similar to a recognized invention and, for example, can execute a process of determining the possibility of obtaining a right in accordance with presence/absence of a similar invention. The determination of whether or not inventions are similar to each other, for example, can be performed by recognizing the meaning (implication) of a recognized invention and determining whether or not a citation invention having a similar implication can be retrieved. The citation invention is patent literature open to the public or non-patent literature. As the patent literature, for example, literature such as a patent publication published by a patent office of each county can be used. In addition, as the non-patent literature, an academic journal, newspaper or a literature posted on a web site or the like can be used. The patent literature or the non-patent literature, for example, may be stored in a dedicated database not illustrated in the drawing and can be configured to be searchable from the determination unit (not illustrated in the drawing). The similarity between meanings of inventions, for example, can be determined whether or not implications of sentences configured by synonyms and the like are similar to each other after extracting keywords from among words included in a recognized invention and retrieving synonyms and the like of the keywords from a database, which is not illustrated in the drawing, storing synonyms or derivatives (synonyms and the like). The determination unit (not illustrated in the drawing) may calculate a degree in which sentences are similar to each other as a degree of similarity. The determination unit (not illustrated in the drawing) may determine that the possibility of obtaining a right is high when the calculated degree of similarity between sentences is low. On the other hand, the determination unit (not illustrated in the drawing) may determine that the possibility of obtaining a right is low when the calculated degree of similarity between sentences is high. The determination unit (not illustrated in the drawing), for example, may perform determination using ranks including "S rank (the possibility is extremely high)," "A rank (the possibility is high)," "B rank (there is a possibility)," "C rank (the possibility is a low)" and the like in accordance with the level of the possibility of obtaining a right. In addition, the determination is not limited to the display of the S rank to the C rank. The determination, for example, may be displays of ⊙ to x in order of highest to lowest possibility.

The determination unit (not illustrated in the drawing) can determine the possibility of obtaining a right on the basis of a result of examination for right obtainment examined in the past by a patent office of each country. The result of examination of right obtainment is a result of examination of an invention relating to an application, cited citation literature, and a comparison therebetween (whether the application is refused on the basis of the citation literature). The determination unit (not illustrated in the drawing) may calculate a degree of similarity between sentences of an invention relating to an application and the cited citation literature, learn a comparison between the calculated degree of similarity and an examination result, and determine the possibility of obtaining a right. By learning comparisons between calculated degrees of similarity and past examination results, the determination unit (not illustrated in the drawing) can use past determinations performed by the patent office as a determination criterion and, accordingly, the determination accuracy for the possibility of obtaining a right can be improved. Examination results may be configured to be stored in the storage unit 102 in advance. The examination results, for example, can be obtained from examination information that is published by a patent office of each county. The determination unit (not illustrated in the drawing) may determine the possibility of obtaining a right on the basis of the examination results.

The output unit 104 controls information output to the user terminal 2 on the basis of data relating to the intellectual property calculated by the calculation unit 103 and similar information. More specifically, the output unit 104 can perform output control of the form of the character 3 on the basis of information of the possibility of obtaining a right calculated by the calculation unit 103. For example, when the determination unit (not illustrated in the drawing) determines that the information of the possibility of obtaining a right described above indicates refusal, the output unit 104 selects a character of grief from character information stored in the storage unit 102 and gives an output instruction to the output unit 104 to display the selected character on the display screen 200. In addition, when the determination unit (not illustrated in the drawing) determines that the information of the possibility of obtaining a right described above indicates refusal, the output unit 104 may give an output instruction to the output unit 104 to select the character of grief from character information stored in the storage unit 102 on the basis of the score or the information of the possibility of obtaining a right and display the selected character.

Furthermore, the output unit 104 may output a keyword calculated by the calculation unit 103 through the character 3. The calculation unit 103 extracts a keyword from the information relating to the intellectual property stored in the storage unit 102. More specifically, when the determination unit (not illustrated in the drawing) determines that the information of the possibility of obtaining a right indicates refusal, a certain new keyword is calculated using a logic determining that the information of the possibility of obtaining a right indicates no refusal by adding the new keyword. Although new keywords of an unlimited number may be listed, to avoid complication, the calculation unit 103 may calculate keywords described in claims of an official gazette of the same or similar technology.

In addition, the determination unit (not illustrated in the drawing) may perform machine learning of past examination results and determine the possibility of obtaining a right. For example, examination results are acquired by the information acquiring unit 101. For example, the determination unit (not illustrated in the drawing) performs machine learning (supervised learning) having a data set of an input and an output, having an invention relating to an application and a citation literature that are cited as the input and having examination results as the output and performs modeling of the learned data set, and thus can determine the possibility of obtaining the right. The data set, for example, may be modeled as a different model in accordance with a country, an applied law (including a law revision), a field of the invention and the like. By using a learning result learned in each modeling, the determination unit (not illustrated in the drawing) can improve a determination accuracy for the possibility of obtaining a right. In addition, by performing machine learning of new examination results acquired by the information acquiring unit 101, even when there is a change in the trend of the examination of the patent office, the determination unit (not illustrated in the drawing) can determine the possibility of obtaining the right in accordance with the change in the trend. As the machine learning, either a supervised learning technique or unsupervised learning technique may be used. As a learning technique of the machine learning, for example, a neural network (including deep learning), a support vector machine, or clustering (for example, the problems to be solved, the first example and the like) or a Bayesian network or the like may be used.

In addition, in this example described above, although when the intellectual property is an invention has been mainly described, for example, registration of a design or registration of a trademark may be determined in accordance with the score of the matching condition and the degree of similarity.

By recording a program to realize functions configuring the device described in this example in a computer-readable recording medium and causing a computer system to read and execute the program recorded in this recording medium, various processes according to this example described above may be performed. The "computer system" described here includes an operating system (OS) and hardware such as peripherals. In addition, when a WWW system is used, "computer system" also includes a home page providing environment (or a display environment). Furthermore, the "computer-readable recording medium" represents a writable nonvolatile memory such as a flexible disk, a magneto-optical disk, a ROM, or a flash memory, a portable medium such as a CD-ROM, or a storage device such as a hard disk built into the computer system.

In addition, the "computer-readable recording medium" includes a medium storing the program for a predetermined time such as an internal volatile memory (for example, a Dynamic Random Access Memory (DRAM)) of a computer system serving as a server or a client when the program is transmitted through a network such as the Internet or a communication line such as a telephone line. In addition, the program described above may be transmitted from a computer system storing this program in a storage device or the like to another computer system through a transmission medium or a transmission wave in a transmission medium. The "transmission medium" transmitting a program represents a medium having an information transmitting function such as a network (communication network) including the Internet and the like or a communication line (communication wire) including a telephone line. The program described above may be used for realizing a part of the functions described above. In addition, the program described above may be a program realizing the functions described above by being combined with a program recorded in the computer system in advance, a so-called a differential file (differential program).

As above, although the example has been described with reference to the drawings, a specific configuration is not limited to this example, and various changes in a range not departing from the concept are included therein.

The invention claimed is:

1. A document information evaluating device comprising:
an information acquiring unit configured to acquire input information input from a user terminal that is able to be operated by a user from the user terminal;
a storage unit configured to store a plurality of pieces of document information;
a calculation unit configured to decompose the input information into predetermined constituent units and calculate a matching condition with one piece of document information among the plurality of pieces of document information stored in the storage unit as a score for each decomposed constituent unit;
an output unit configured to output a comparison table representing a degree of difference between the input information and the document information for each constituent unit on the basis of the score; and
an input unit configured to input a self-evaluation of the document information that is performed by the user to the comparison table,
wherein the output unit:
outputs document information in which scores of the matching condition calculated for each constituent unit satisfies a predetermined criterion as a primary reference, and
outputs a score of the matching condition for each constituent unit in the document information is higher than a predetermined value, the score of the matching condition being lower than the predetermined value in the primary reference, as a secondary reference to the comparison table.

2. The document information evaluating device according to claim 1, wherein the output unit performs output by switching to a high evaluation mode representing that the document information is good or a low evaluation mode representing that the document information is not good in accordance with a result of the self-evaluation input by the input unit.

3. The document information evaluating device according to claim 2, wherein the output unit outputs each piece of document information by switching to the high evaluation mode or the low evaluation mode for each constituent unit.

4. The document information evaluating device according to claim 1, wherein the output unit is adapted to output a degree of difference between the input information and the plurality of pieces of document information to the comparison table for each constituent unit of the input information, and output priority levels of the plurality of pieces of document information are determined on the basis of whether or not the score calculated for each constituent unit satisfies a predetermined criterion.

5. The document information evaluating device according to claim 1, wherein the input information and the plurality of pieces of document information include information relating to intellectual properties.

6. The document information evaluating device according to claim 5, wherein the calculation unit reflects switching of a self-evaluation mode that represents the self-evaluation and re-calculates the matching condition of the document information with respect to the input information.

7. The document information evaluating device according to claim 5, further comprising a document information fixing unit configured to fix at least one piece of desired document information desired by the user among the plurality of pieces of document information output to the comparison table as main document information, wherein the calculation unit re-calculates the matching condition of the document information with respect to the input information on the basis of the main document information fixed by the document information fixing unit.

8. The document information evaluating device according to claim 1, wherein the output unit determines that document information satisfies a predetermined criterion when the average score of the degree of matching condition of constituent units is equal to or greater than the predetermined value among all the constituent units divided into a plurality of units, and outputs the document information as a primary reference.

9. The document information evaluating device according to claim 8, wherein the output unit performs output by switching to a high evaluation mode representing that the document information is good or a low evaluation mode representing that the document information is not good in accordance with a result of the self-evaluation input by the input unit.

10. The document information evaluating device according to claim 9, wherein the output unit outputs each piece of document information by switching to the high evaluation mode or the low evaluation mode for each constituent unit.

11. The document information evaluating device according to claim 8, wherein the output unit is able to output a degree of difference between the input information and the plurality of pieces of document information to the comparison table for each constituent unit of the input information, and output priority levels of the plurality of pieces of document information are determined on the basis of whether or not the score calculated for each constituent unit satisfies a predetermined criterion.

12. The document information evaluating device according to claim 8, wherein the input information and the plurality of pieces of document information include information relating to intellectual properties.

13. The document information evaluating device according to claim 12, wherein the calculation unit reflects switching of a self-evaluation mode that represents the self-evaluation and re-calculates the matching condition of the document information with respect to the input information.

14. The document information evaluating device according to claim 12, further comprising a document information fixing unit configured to fix at least one piece of desired document information desired by the user among the plurality of pieces of document information output to the comparison table as main document information,
wherein the calculation unit re-calculates the matching condition of the document information with respect to the input information on the basis of the main document information fixed by the document information fixing unit.

15. A document information evaluating method causing a computer to execute:
- an information acquiring step of acquiring input information input from a user terminal that is adapted to be operated by a user from the user terminal;
- a storage step of storing a plurality of pieces of document information;
- a calculation step of decomposing the input information into predetermined constituent units and calculating a matching condition with one piece of document information among the plurality of pieces of document information stored in the storage step as a score for each decomposed constituent unit;
- an output step of outputting a comparison table representing a degree of difference between the input information and the document information for each constituent unit on the basis of the score; and
- an input step of inputting a self-evaluation of the document information that is performed by the user to the comparison table, wherein the output step:
outputs document information in which scores of the matching condition calculated for each constituent unit satisfies a predetermined criterion as a primary reference, and
outputs a score of the matching condition for each constituent unit in the document information is higher than a predetermined value, the score of the matching condition being lower than the predetermined value in the primary reference, as a secondary reference to the comparison table.

16. A non-transitory computer-readable medium recording medium comprising a document information evaluating program, causing a computer to execute:
- an information acquiring function of acquiring input information input from a user terminal that is adapted to be operated by a user from the user terminal;
- a storage function of storing a plurality of pieces of document information;
- a calculation function of decomposing the input information into predetermined constituent units and calculating a matching condition with one piece of document information among the plurality of pieces of document information stored in the storage function as a score for each decomposed constituent unit;
- an output function of outputting a comparison table representing a degree of difference between the input information and the document information for each constituent unit on the basis of the score; and
- an input function of inputting a self-evaluation of the document information that is performed by the user to the comparison table, wherein the output function:
outputs document information in which scores of the matching condition calculated for each constituent unit satisfies a predetermined criterion as a primary reference, and
outputs a score of the matching condition for each constituent unit in the document information is higher than a predetermined value, the score of the matching condition being lower than the predetermined value in the primary reference, as a secondary reference to the comparison table.

* * * * *